United States Patent [19]
Homberg et al.

[11] 3,923,957
[45] Dec. 2, 1975

[54] CONVERSION OF HYDROGEN CYANIDE IN FOUL GAS STREAMS TO CARBON DISULFIDE

[75] Inventors: Otto A. Homberg, Easton; Charles W. Sheldrake; James B. Lynn, both of Bethlehem, all of Pa.

[73] Assignee: Bethlehem Steel Corporation, Bethlehem, Pa.

[22] Filed: Oct. 3, 1973

[21] Appl. No.: 403,247

[52] U.S. Cl. .................. 423/236; 423/220; 423/443
[51] Int. Cl.² .......................................... C01C 3/00
[58] Field of Search ............ 423/236, 244, 443, 220

[56] References Cited
UNITED STATES PATENTS

| | | | |
|---|---|---|---|
| 1,317,583 | 9/1919 | Leamon | 423/244 |
| 2,700,600 | 1/1955 | Odell | 423/236 |
| 2,743,153 | 4/1956 | Marsh et al. | 423/236 |
| 2,817,580 | 12/1957 | Marsh et al. | 423/236 |
| 2,839,356 | 6/1958 | Karl | 423/236 |
| 3,345,135 | 10/1967 | Kerr et al. | 423/443 |
| 3,755,551 | 8/1973 | Bridwell et al. | 423/443 |

FOREIGN PATENTS OR APPLICATIONS

| | | | |
|---|---|---|---|
| 276,347 | 3/1929 | United Kingdom | 423/236 |
| 5,959 | 1883 | United Kingdom | 423/573 |
| 695,496 | 5/1953 | United Kingdom | 423/236 |

OTHER PUBLICATIONS

Jacobson– Encyclopedia of Chemical Reactions – 1958 – p. 96.

*Primary Examiner*—Edward J. Meros
*Assistant Examiner*—Eugene T. Wheelock
*Attorney, Agent, or Firm*—Joseph J. O'Keefe; Charles A. Wilkinson

[57] ABSTRACT

A method of eliminating hydrogen cyanide, particularly hydrogen cyanide present in foul gas streams, is achieved by reacting hydrogen cyanide with hydrogen sulfide and oxygen to produce ammonia and carbon sulfides. A preferred embodiment destroys the hydrogen cyanide present in foul acid gas streams recovered from industrial gas desulfurizers, and the process is particularly useful when employed prior to a Claus or similar sulfur recovery unit. The process can also be used to produce commercial quantities of carbon disulfide.

19 Claims, 2 Drawing Figures

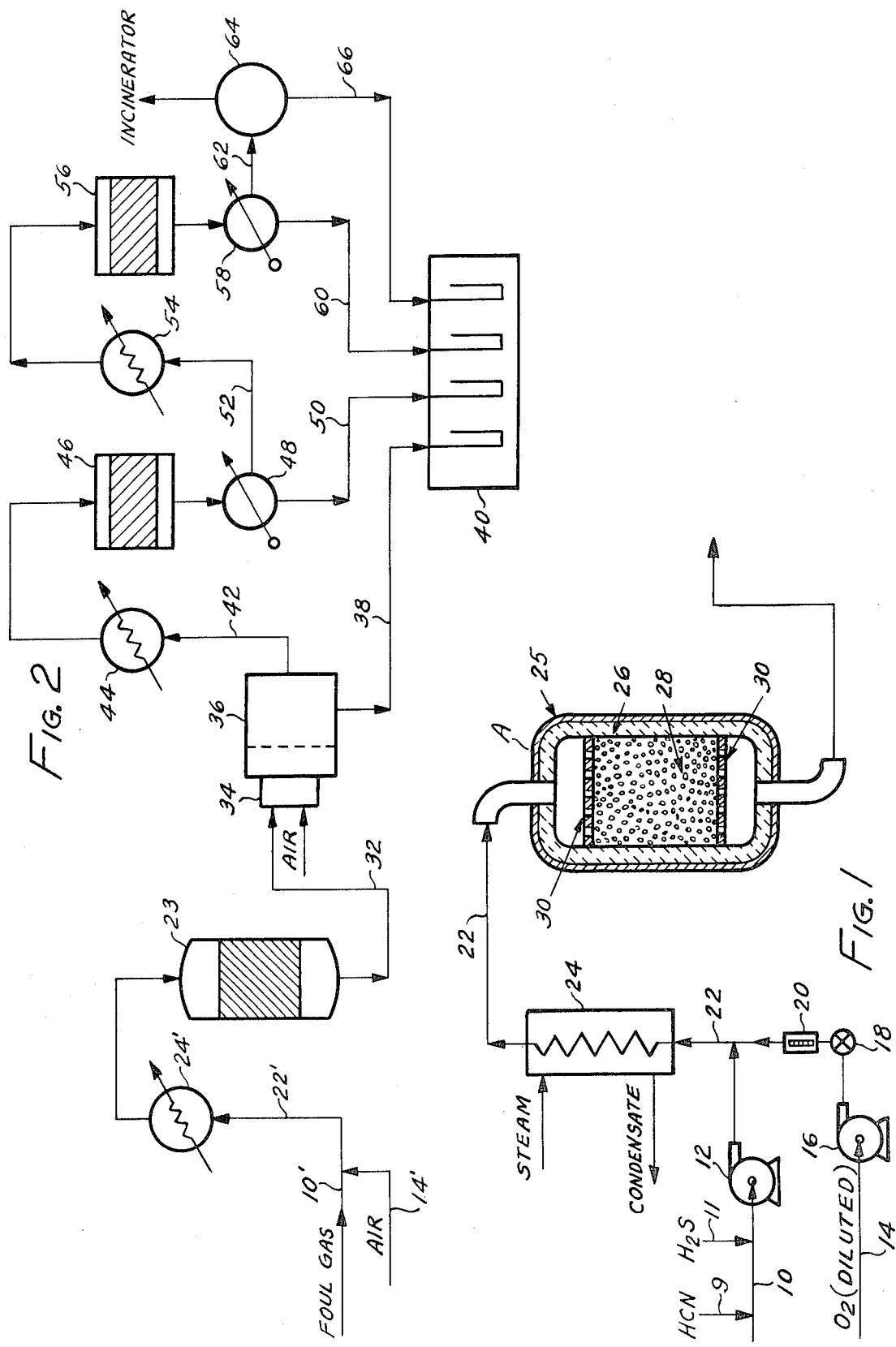

CONVERSION OF HYDROGEN CYANIDE IN FOUL GAS STREAMS TO CARBON DISULFIDE

BACKGROUND OF THE INVENTION

A. Field of the Invention

This invention relates to acid gas processing and more particularly to the removal of hydrogen cyanide from industrial gases.

B. Prior Art

Recently enacted pollution abatement standards limiting sulfur emissions to the atmosphere have necessitated removing nearly all the sulfur from fuel gases, such as coke oven gas, natural gas, water gas, and other industrial gases. Frequent additional contaminants in these gases, which are usually removed from the fuel gas along with the sulfurous components, are carbon dioxide and hydrogen cyanide. Together these three gases along with any additional contaminants are known as foul or acid gas. Once separated from the fuel gas by any one of several known processes the acid gases are generally further processed to convert the sulfurous components to elemental sulfur or sulfuric acid. When it is present, hydrogen cyanide interferes with these conversions and must be removed.

When the sulfurous gases are converted to elemental sulfur as in a Claus sulfur recovery unit, for example, the presence of hydrogen cyanide, which is incompletely burned in the limited oxygen atmosphere of the burner, results in extensive corrosion of the subsequent apparatus and the production of dark, contaminated sulfur.

When sulfuric acid is the desired product, the presence of hydrogen cyanide results in the formation of nitrogen oxides, which, together with unburned hydrogen cyanide, results in deactivation of the vanadium oxide catalyst of the contact process. The nitrogen oxides also result in extensive corrosion of equipment due to formation of nitroso compounds. Furthermore, the nitrogen oxides result in the continued formation of sulfuric acid in the tail gas stock of the chamber process. This results in heavy corrosion of this equipment and emission of sulfuric acid to the environment.

Prior art acid gas proposals for dealing with HCN, particularly where both HCN and $H_2S$ are present in a gas composition, have included processes which separate the HCN from the $H_2S$ by a wash solution containing metallic cations and which operate by precipitating metallic cyanides. U.S. Pat. No. 2,169,282 to Pieters, U.S. Pat. No. 2,088,003 to Speer and U.S. Pat. No. 2,140,605 also to Speer, are examples of HCN wash systems.

U.S. Pat. No. 2,817,580 to Marsh et al. recognizes the need to remove HCN prior to a Claus process, and thereby proposes to catalytically hydrolyze the HCN in the acid gas in situ to form ammonia. The ammonia is then washed out of the gases, leaving an HCN free acid gas which is subsequently subjected to a Claus process to convert the $H_2S$ to free sulfur.

Marsh's hydrolysis process has many disadvantages, including temperature requirements, because for complete HCN removal by hydrolysis, temperatures of from 300°–400° C. are required in the hydrolysis unit.

There has been, heretofore, no process for the elimination of hydrogen cyanide from gases, particularly industrial acid gases, which both removes and destroys this component with simplicity, efficiency and economy.

SUMMARY OF THE INVENTION

We have discovered a process for destroying hydrogen cyanide (HCN), particularly the HCN which is associated with industrial gases as a component of foul, i.e., acid gas, streams, and converting such HCN to a large extent to carbon disulfide. In the process of this invention HCN is reacted with hydrogen sulfide ($H_2S$) and oxygen ($O_2$) (the latter may be supplied as air) at an elevated temperature above about 70° to 85°C. and in the presence of a reaction substrate. The exit gas analysis shows little or no HCN remaining. While we do not wish to be bound by a theory of how our process works, we postulate from an analysis of the catalytic reactor exit gases that the following reaction occurs:

$$HCN + 2 H_2S + \tfrac{1}{2} O_2 \rightarrow CS_2 + NH_3 + H_2O$$

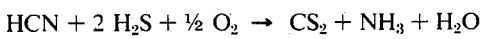

We have ascertained that Equation (1) is a surface reaction and therefore any reaction substrate of solid material, which provides a surface area for contact of the reactants is suitable in our process. We have used, for example, materials ranging from the glass beads to high surface area catalysts. However, to maximize the potential of our process, heterogeneous catalysts such as bauxite, alumina and alumina-supported metals are preferred. Our process may be utilized as either a process to destroy HCN and/or $H_2S$, or as a method to produce $CS_2$ and $NH_3$. We have found, however, that our invention is particularly advantageous in eliminating the HCN content of foul gases. In this capacity we have reduced the HCN contents of coke oven foul gases — i.e., the tail gases from a coke oven desulfurization unit — from an initial high of 30% to less than 0.1% HCN. In the practice of the preferred embodiment of our process oxygen is added to a foul gas, which contains principally $H_2S$, HCN and $CO_2$, in sufficient quantities so that ½ mole of $O_2$ is present for each mole of hydrogen cyanide. The gas is then passed through a reactor containing a solid substrate at above 100° C. where the oxygen and hydrogen cyanide react with hydrogen sulfide according to the stoichiometry of Equation (1) to effect the desired cyanide destruction.

While a particularly desirable use of our process is in the elimination of HCN from foul industrial gases prior to disposal or use of the gas as a feed for a sulfur production unit, our process is broadly useful for the elimination of HCN from almost any industrial gas containing HCN and may also be used for the manufacture of carbon disulfide from foul, or acid, industrial gases.

BRIEF DESCRIPTION OF THE DRAWING

FIG. 1. is a schematic representation of a mode for destroying gaseous hydrogen cyanide.

FIG. 2 is a schematic representation of a preferred embodiment of this invention, when used in conjunction with a Claus sulfur recovery unit.

DETAILED DESCRIPTION

For the practice of our invention a first general description will be given, followed by a detailed description and specific examples showing how the hydrogen cyanide content of a gas stream may be eliminated by our method. Thirdly, a specific embodiment of our method will be disclosed wherein the hydrogen cyanide present in foul gases derived from coke oven gas desulfurizer unit is destroyed, prior to utilizing these gases in a process for converting the sulfurous components present to elemental sulfur, leaving thereby a non-polluting tail gas. Finally, a means of isolating and recovering the carbon disulfide produced in the process of eliminating the hydrogen cyanide will be described.

Beginning with a general description, we destroy hydrogen cyanide by reacting it in gaseous phase with $H_2S$ and $O_2$ according to the equation:

$$HCN + O\ 2\ H_2S + \tfrac{1}{2}\ O_2 \rightarrow CS_2 + NH_3 ; H_2O \qquad (1)$$

Our method may be practiced by providing a reaction zone containing a reaction substrate, i.e., a solid material surface, for the reaction to occur. The reaction zone may be a simple chamber containing a solid material, such as a heterogeneous catalyst, through which the reactants pass. A "reaction substrate" means a surface or surfaces upon or in the proximity of which the reaction of Equation (1) may be initiated and conducted. Suitable reaction substrates for our method may range from glass beads to heterogeneous catalysts, such as high surface area alumina or alumina/silica supported metals. Heterogeneous catalysts which have been successfully utilized in our process include supported and non-supported catalysts, including zeolites, bauxites, alumina, silica, and cobalt molybdate on alumina. The reaction rate is a function of temperature and contact time, and, consequently, the higher the temperature the shorter the contact time required, and the lower the temperature the longer the contact time necessary to reach equilibrium. We have successfully operated at temperatures as low as about 85° C. The reaction is, however, exothermic and elevated temperatures can normally be anticipated, particularly under plant operating conditions. We have, for example, measured reaction temperatures as high as about 500° C., and although the product mix may alter at high temperatures, as will be described in more detail hereinafter, we have found that the hydrogen cyanide destruction remains effective at these high temperatures.

For a more detailed description, referring now to FIG. 1, HCN in line 9 is combined at line 10 with $H_2S$ from line 11. The combined gas stream, which may analyze up to about 33⅓ mole percent HCN, is pumped through pump 12 to increase the pressure sufficiently to force the gas stream through the subsequent apparatus. The pressure is not important but serves to assure a gas flow appropriate to the particular apparatus. Simultaneously, oxygen either pure or as air or diluted as, for example, with air, nitrogen or similar gas or gases, is passed from line 14 through pump 16, air control valve 18, rotameter 20, and is mixed with the combined HCN and $H_2S$ gas stream, in line 22. The gases then enter heat exchanger 24 where they emerge heated to about 100° C. or higher and enter catalytic reactor, generally A. The catalytic reactor may include, for example, a shell 25 of carbon steel, and an inner refractory liner 26, and is filled with, for example, pelletized bauxite 28 contained between grid plates 30. The heated reactants travel through the catalyst emerging from the bottom of reactor A with a typical analysis showing no more than 0.25 mole percent hydrogen cyanide remaining in the gas system.

Various experiments were run according to the aforementioned description. Table I contains data derived from nine such experiments in which the reactor consisted of a one inch stainless steel tube containing four inches of bauxite (28 cc) supported on nine inches of ⅛ inch diameter alundum balls. The feed gas, whose analysis is shown in Table I, is typical of a coke oven acid gas. This gas was derived from a vacuum carbonate desulfurizer unit used for desulfurizing coke oven gas. This is a standard unit for desulfurizing coke oven and other fuel gases. It will be understood that this gas could have been derived from any other desulfurizing system such as a standard amine type desulfurizer system, for example a monoethanolamine type desulfurizer. The feed gas analysis shown in Table I was taken prior to running experiments 1 thru 9, and it is expected by nature of the coke oven operation that the actual concentration varied somethwat over the series of experiments. This feed gas was passed over the catalyst bed at the various temperatures and flow rates indicated in Table I in the manner described supra for FIG. 1. The hydrogen cyanide in the product gas was monitored by means of an infrared spectrometer, while the complete composition of the product gas was determined by means of a mass spectrometer. The analysis obtained, in common with the usual mass spectrometer analyses, are accurate to within approximately plus or minus 2% of the values found.

TABLE 1

| Example No. | Feed Gas | ELIMINATION OF HYDROGEN CYANIDE FROM AN ACID GAS | | | | | | | | |
| | | 1 | 2 | 3 | 4 | 5 | 6 | 7 | 8 | 9 |
| --- | --- | --- | --- | --- | --- | --- | --- | --- | --- | --- |
| Reactor Temperature, °C. | | 85° | 85° | 85° | 127° | 138° | 138° | 138° | 138° | 205° |
| Gas Flow Rate, milliliter/minute | | 100 | 200 | 400 | 200 | 400 | 233 | 300 | 400 | 400 |
| Gas Analysis (in mole %)* | | | | | | | | | | |
| Hydrogen cyanide | 5.3 | 0.2 | 2.5 | 5.5 | 0.2 | 0.3 | 0.2 | 0.2 | 0.8 | 0.2 |
| Carbon monoxide | 0.1 | 0.5 | 0.3 | 0.1 | 0.6 | 0.7 | 0.5 | 0.5 | 0.1 | 0.3 |
| Carbon dioxide | 11.4 | 8.9 | 8.8 | 8.7 | 7.5 | 6.9 | 8.3 | 8.3 | 8.8 | 9.4 |
| Hydrogen sulfide | 81.9 | 73.6 | 82.1 | 83.1 | 71.5 | 83.0 | 78.4 | 72.3 | 78.4 | 73.7 |
| Nitrogen | 0.0 | 10.4 | 2.1 | 0.0 | 11.9 | 2.3 | 10.7 | 11.0 | 4.8 | 9.7 |
| Carbonyl sulfide | 0.0 | 0.0 | 0.0 | 0.0 | 0.1 | 0.1 | 0.2 | 0.3 | 0.2 | 0.4 |
| Carbon disulfide | 0.0 | 4.7 | 2.3 | 0.6 | 6.4 | 5.1 | 5.0 | 5.6 | 4.9 | 4.3 |
| Sulfur dioxide | 0.2 | 0.2 | 0.2 | 0.2 | 0.2 | 0.2 | 0.2 | 0.2 | 0.2 | 0.2 |
| Hydrocarbons | 1.0 | 1.1 | 1.2 | 1.1 | 1.2 | 1.2 | 1.2 | 1.2 | 1.2 | 1.2 |
| Argon | 0.0 | 0.1 | 0.1 | 0.1 | 0.1 | 0.1 | 0.1 | 0.1 | 0.1 | 0.1 |

*The gases were analyzed on a dry, air free basis. In the process of obtaining the gas sample the ammonia produced in the elimination reaction was condensed from the gas stream as ammonium carbonate, so that the observed analysis must be adjusted accordingly.

From the data in Table I the conditions, in terms of contact time and temperature, can be selected to destroy virtually all of the hydrogen cyanide in the feed gas. It is apparent from these data that the rate of hydrogen cyanide conversion increases with the temperature and contact time; however, at the higher temperatures carbonyl sulfide appears in the product gas with a corresponding decrease in carbon disulfide. Three postulated sources for this carbonyl sulfide are:

$$CO_2 + H_2S \rightarrow COS + H_2O \quad (2)$$
$$CS_2 + H_2O \rightarrow COS + H_2S \quad (3)$$
$$CO_2 + CS_2 \rightarrow 2\ COS \quad (4)$$

The data suggests that reactions (3) and (4) are largely responsible for introducing carbonyl sulfide into the product gas. Nonetheless, the occurrence of these reactions does not affect the destruction of hydrogen cyanide.

In a specific example of our method of HCN destruction, as applied to the Claus process for sulfur recovery, and referring now to FIG. 2, a foul gas derived from a coke oven gas desulfurizer (not shown) at about 9.0 psig. (pounds per square inch gauge) in line 10 is combined with air from line 14' and the combined gases pass through heat exchanged 24' in line 22' where they are heated to about 100° C. Proceeding from the heat exchanger, the gases enter catalytic reactor 23. Catalytic reactor temperatures range up to 250° C. and, after passing through the reactor the exit gases emerge in line 32. From line 32 the exhaust gases are directed to hydrogen sulfide burner 34 and thermal reactor 36.

Beginning with burner 34 the succeeding units of the process are often collectively referred to in the prior art as the Claus process. In accordance with the usual Claus process, burner 34 generates $SO_2$ from $H_2S$ present in the gas feed and the $SO_2$ reacts in thermal reactor 36 with the $H_2S$ according to:

$$2\ H_2S + SO_2 \rightarrow 2\ H_2O + S \quad (5)$$

Sulfur is produced in thermal reactor 36 and leaves the reactor in line 38 to sulfur storage unit 40. Gases exit from thermal reactor 36 in line 42 at about 160° C., are heated to about 235° C. in heater 44 and enter catalytic reactor 46. Emerging from catalytic reactor 46, where sulfur is produced according to Equation (5), the reactor gases are cooled to about 160° C., in cooler 48, causing more sulfur to precipitate. This sulfur enters sulfur storage unit by line 50. In a manner similar to the one just described, the exit gases from reactor 46 leave cooler 48 in line 52, are reheated in heater 54, and enter catalytic reactor 56. The product of reactor 56 is cooled in cooler 58 to about 160° C., causing sulfur again to precipitate. The sulfur travels to sulfur storage unit 40 in line 60 and the tail gases leave cooler 58 by line 62 and enter tail gas separator 64. In tail gas separator 64, residual sulfur precipitates, is sent to sulfur storage unit 40 in line 66 and the tail gases emerging from unit 64 proceed to a stack gas incinerator (not shown) for removal of trace $H_2S$ prior to discharge of the purified tail gas.

An analysis of the gases during the course of the Claus reaction indicates that the ammonia produced by our method is disassociated in burner 34 to hydrogen and nitrogen, the hydrogen then burning to water. The carbon sulfides (either the $CS_2$ or the COS) are also largely destroyed in the burner. The Claus process apparatus shows none of the corrosion apparent before the implementation of our HCN destruct system.

There are many variations possible within the scope of our invention. For example, the gas inlet composition is not restricted solely to the reactants. That is, the $H_2S$, HCN and $O_2$ may be the only gases or they may be part of a gas stream containing many other components. We have ascertained, for example, that the presence of carbon oxides, chiefly carbon dioxide (a common foul gas component) are not detrimental to our method even though they may participate in the reaction sequences as shown in equations (2), (3) and (4). Further, water vapor does not adversely affect the Equation (1) reaction. More importantly, excess $H_2S$ has no effect on the reaction and thus our process is particularly suitable as a method of purifying $H_2S$ gas streams of their HCN content which, if allowed to remain, would prove detrimental during subsequent $H_2S$ treating processes.

The temperature at which our process may be conducted may vary from a low of about 70° C. to 500° C. or above; however, a low of about 85° C. is a more practical lower operating limit and we prefer to operate within a range of about 100° C. to 400° C. or more. As mentioned above the reaction in the catalytic converter is exothermic and with high cyanide concentrations in the gas the temperature within the converter will reach high elevations unless special provisions are made for cooling. Such provisions may include dilution of the gas with inert gases, steam, or other cooling agents, or, in some cases, the use of cooling coils. Too high temperatures cannot be allowed else the converter may be damaged or even melt. With most cyanide concentrations, however, extremely elevated temperatures are not likely to occur. If, on the other hand, cyanide concentration in the gas is very low, it may be necessary to add extra heat to the catalytic converter, at least initially, in order to maintain the temperature of the reaction in the best operating range in light of the contact time.

Our process occurs with facility. It is believed, based on the variety of catalyst we have employed, that the catalyst is not involved chemically in the reaction. For example, we have successfullly utilized bauxite, cobalt molybdate on an alumina support, alumina alone, alundum (which is refractory alumina of low surface area characteristics), pyrex glass beads of three-sixteenths inch diameter (the kind commonly used as laboratory packing for distillation columns), silica on alumina support, molecular sieve (a synthetic zeolite), activated carbon, zirconia promoted nickel, promoted palladium, and barium promoted copper chromite.

The process of this invention has many advantages.

Among the advantages, useful compounds are synthesized, and our process thus may be utilized to produce ammonia and carbon sulfides.

Of particular interest is the formation and isolation of useful quantities of carbon disulfides. In this case the tail gas from our catalytic reactor is washed with a hydrocarbon oil such as is utilized in isolating light oils from coke oven gas. The carbon disulfide is absorbed in the oil, while the other components of the gas are largely unaffected. The carbon disulfide is then recovered from the oil by distillation. On the basis of laboratory experiments in which tail gases from experiments similar to those described in the preceding table were scrubbed with hydrocarbon wash oils it is estimated that better than 95% of the carbon disulfide produced can thus be recovered.

We have found our process to be particularly useful as a means of eliminating hydrogen cyanide, a noxious, corrosive gas from tail gas streams. In the instance of our process being utilized as a cyanide destruct system in, for example, acid waste gas treatment, our invention is simple to install and use. Our method is readily adaptable to existing industrial waste gas processing installations as it requires no extensive new or expensive apparatus. Our process will destroy the HCN in gases of widely varying composition without problems. The reaction products, ammonia and carbon sulfides, produced by our method are non-corrosive to equipment, therefore, it is possible to utilize our process as one of a series of gas component treatments with an economy of operation.

Our process is inexpensive. The reaction substrates which we require for our Equation (1) reaction are only simple surfaces and any one of the many, simple heterogeneous catalysts whose function is to provide a surface area on which the reaction may be conducted is therefore suitable for our method. Our process is also efficient. Hydrogen cyanide destruction from 30 percent to less than 0.1 percent of the gas stream is readily accomplished with simplicity and economy.

Finally, it should be understood that this invention may be embodied in specific forms other than those illustrated without departing from the spirit or essential characteristics thereof. The embodiments illustrated should therefore not be considered limiting but rather the scope of this invention should be limited only by consideration of the appended claims.

We claim:

1. A low temperature method of eliminating hydrogen from a foul gas stream derived from a fuel gas desulfurization system in which the gas stream includes up to about 33-⅓ mole percent HCN and the mole percent of $H_2S$ is at least twice the HCN mole percent and with the balance, if any, essentially carbon dioxide and any other inert gases, said method comprising the steps of:
   a. combining the gas stream with air in sufficient quantities to supply at least one half mole of oxygen for each mole of hydrogen cyanide present in the foul gas,
   b. heating the foul gas and air mixture to about 70°C to 500°C to form a feed gas,
   c. passing the heated feed gas over a heterogeneous catalyst at such a rate that ammonia and carbon disulfide are produced from the hydrogen cyanide, hydrogen sulfide and oxygen substantially in accordance with the equation:
   $$HCN + 2H_2S + \tfrac{1}{2} \rightarrow CS_2 + NH_3 + H_2O.$$

2. A method according to claim 1 wherein the foul gas and air mixture is heated to a temperature above 100° C.

3. A method according to claim 2 wherein the foul gas and air mixture is heated to a range within about 100° C. to 400° C.

4. A method of producing tail gases free of their hydrogen sulfide and hydrogen cyanide content comprising in sequential order:
   a. providing a foul gas stream derived from a fuel gas desulfurization system the components of which gas include hydrogen sulfide and hydrogen cyanide, with the former in at least twice the molar quantity of the latter, and air in an amount to provide at least ½ mole of oxygen for each mole of hydrogen cyanide present,
   b. passing the foul gas stream over a heterogeneous catalyst at a temperature of about 70°C to 500°C to simultaneously reduce the hydrogen cyanide and hydrogen sulfide content of the foul gas stream and produce ammonia, carbon disulfide and water by the reaction:
   $$HCN + 2H_2S + \tfrac{1}{2} \rightarrow CS_2 + NH_3 + H_2O$$
   so as to produce a feed gas.
   c. providing sulfur dioxide in a molar quantity equal to about one half the molar quantity of hydrogen sulfide remaining in said feed gas and combining said sulfur dioxide with the hydrogen sulfide in said feed gas,
   d. passing the combined gases of step (c) over a heterogeneous catalyst for a time and at a temperature sufficient to simultaneously reduce the hydrogen sulfide and sulfur dioxide content and produce elemental sulfur and water, in accordance with the reaction:
   $$2H_2S + SO_2 \rightarrow 2H_2O + 2S$$
   so as to produce a substantially non-polluting tail gas.

5. The method of claim 4 in which the heterogeneous catalyst for both steps (b) and (d) comprises bauxite.

6. A method of producing carbon disulfide from foul gas streams derived from a fuel gas desulfurization system containing hydrogen cyanide and hydrogen sulfide comprising reacting the hydrogen cyanide and hydrogen sulfide with oxygen at a temperature of about 70°C. to 500°C in the presence of a catalytic reaction substrate to produce carbon disulfide, ammonia, and water in accordance with the equation:
$$HCN + 2H_2S + \tfrac{1}{2}O \rightarrow CS_2 + NH_3 + H_2O.$$

7. A method in accordance with claim 6 in which the reaction substrate is a heterogeneous catalyst.

8. The method of claim 6 in which, for each mole of hydrogen cyanide present, at least two moles of hydrogen sulfide and ½ mole of oxygen are supplied.

9. The method of claim 7 in which, for each mole of hydrogen cyanide present, at least two moles of hydrogen sulfide and ½ mole of oxygen are supplied.

10. The method of claim 6 in which the oxygen is supplied as a component of air.

11. The method of claim 7 in which the oxygen is supplied as a component of air.

12. The method of claim 7 in which the catalyst is selected from the group consisting of: bauxite, alumina, cobalt molybdate on alumina, silica, activated carbon, zirconia promoted nickel, palladium and barium promoted chromite.

13. The method of claim 11 in which the catalyst is selected from the group consisting of: bauxite, alumina, cobalt molybdate on alumina, silica, activated carbon, zirconia promoted nickel, palladium and barium promoted chromite.

14. A low temperature method of removing hydrogen cyanide from a foul gas stream derived from a fuel gas desulfurization system comprising
   a. providing sufficient oxygen and hydrogen sulfide in said gas stream to react in stoichimetric ratio with the amount of hydrogen cyanide which is to be removed from said gas stream in accordance with the equation:
   $$HCN + 2H_2S + \tfrac{1}{2}O_2 \rightarrow CS_2 + NH_3 + H_2O$$
   b. contacting said gas stream with a surface active catalyst at a temperature of about 70°C to 500°C to convert the hydrogen cyanide content of the gas stream to carbon disulfide, ammonia and water in accordance with said equation.

15. A method according to claim 14 wherein the conversion of the hydrogen cyanide is accomplished within a reaction temperature range of 100° to 400°C.

16. A low temperature method of removing hydrogen cyanide from a foul gas stream derived from a fuel gas desulfurization system containing hydrogen sulfide in an amount in moles at least twice the amount of moles of the hydrogen cyanide comprising
   a. providing sufficient oxygen in said gas stream to react in stoichimetric ratio with the amount of hydrogen cyanide which is to be removed from said gas stream in accordance with the equation:
   $$HCN + 2H_2S + \tfrac{1}{2}O_2 \rightarrow CS_2 + NH_3 + H_2O$$
   b. contacting said gas stream with a surface active catalyst at a temperature of about 70°C to 500°C to convert the hydrogen cyanide content of the gas stream to carbon disulfide, ammonia and water in accordance with said equation.

17. The method of claim 16 wherein the catalyst is selected from the group consisting of bauxite, alumina, cobalt molybdate, silica, activated charcoal, zirconia, promoted nickel, palladium and barium promoted chromite.

18. The method of claim 17 wherein the conversion of the hydrogen cyanide is accomplished within a temperature range of 100°C to 400°C.

19. The method of claim 18 wherein substantially the entire content of hydrogen cyanide of the gas is converted to carbon disulfide, ammonia and water and the hydrogen cyanide free gas is then passed as a feed gas to a Claus type process for the removal of sulfur values from the gas stream as elemental sulfur.

* * * * *